United States Patent
Sedighi et al.

(10) Patent No.: US 10,699,047 B2
(45) Date of Patent: Jun. 30, 2020

(54) ENERGY REDUCTION METHOD BY APPROXIMATION FOR FPGA

(71) Applicants: Mehdi Sedighi, San Francisco, CA (US); Amir Bavafa Toosi, San Francisco, CA (US)

(72) Inventors: Mehdi Sedighi, San Francisco, CA (US); Amir Bavafa Toosi, San Francisco, CA (US)

(*) Notice: Subject to any disclaimer, the term of this patent is extended or adjusted under 35 U.S.C. 154(b) by 0 days.

(21) Appl. No.: 16/115,499

(22) Filed: Aug. 28, 2018

(65) Prior Publication Data

US 2020/0074033 A1    Mar. 5, 2020

(51) Int. Cl.
| | |
|---|---|
| *G06F 17/50* | (2006.01) |
| *G06F 30/34* | (2020.01) |
| *G06F 11/07* | (2006.01) |
| *G05B 13/04* | (2006.01) |

(52) U.S. Cl.
CPC .......... *G06F 30/34* (2020.01); *G06F 11/0754* (2013.01); *G05B 13/04* (2013.01); *G06F 11/0724* (2013.01)

(58) Field of Classification Search
CPC ............. G06F 17/5054; G06F 11/0754; G06F 11/0724; G05B 13/04
USPC .......................................... 716/116–117, 133
See application file for complete search history.

(56) References Cited

U.S. PATENT DOCUMENTS

| | | | |
|---|---|---|---|
| 7,603,646 B1* | 10/2009 | Jang .................... | G06F 17/5054 703/14 |
| 8,010,931 B1* | 8/2011 | French ................ | G06F 17/5054 703/14 |
| 2006/0058994 A1* | 3/2006 | Ravi ....................... | G06F 30/33 703/23 |

OTHER PUBLICATIONS

Tsang et al. Dynamic Power Reduction of FPGA-based Reconfigurable Computers using Precomputation, Sep. 2010, ACM SIGRACH Computer Architecture News, vol. 38, No. 4, pp. 87-92 (Year: 2010).*

* cited by examiner

Primary Examiner — Nghia M Doan
(74) *Attorney, Agent, or Firm* — Barry Choobin; Patent 360

(57) ABSTRACT

A method for applying approximate computing to internal circuits of a digital system is disclosed. The digital system is implemented on an LUT based reconfigurable device such as Field Programmable Gate Array (FPGA). The method includes generating a bit stream containing information regarding contents of a Look Up Table (LUT) and the connection between multiple LUTs. The method further includes generating an FPGA approximate design by implementing exact design using an FPGA design tool. Further, the method includes providing an input, the bit stream and FPGA design to a simulation tool. The method includes manipulating the bit stream to create an approximate design for reducing the dynamic power consumption of the digital system. The bit stream is manipulated by injecting/introducing an error on a single or multiple LUT or intermediate LUTs based on a theory of approximation while ensure that total error does not exceed the maximum possible error rate.

17 Claims, 4 Drawing Sheets

FIG. 2C

ENERGY REDUCTION METHOD BY APPROXIMATION FOR FPGA

TECHNICAL FIELD

The embodiments herein are generally related to integrated circuits. The embodiments herein are particularly related to a method for power reduction of reconfigurable devices. The embodiments herein are more particularly related to a method for reducing power consumption of reconfigurable devices using approximate computing.

DESCRIPTION OF THE RELATED ART

Power consumption and various techniques for reduction of power consumption in digital system has been a concern to designers for a long time. The digital systems receive power from a power supply or a battery. When the digital systems receive power from the power supply, there are chances that the digital systems may get heated up. In such cases, the designers struggle to reduce the power consumption primarily to ease the burden on keeping the system cool enough to remain functional. Further, the digital systems such as handheld devices (generally called Embedded Systems) receive the power through energy storage devices such as a battery. In such cases, it is of utmost importance to reduce the power consumption as much as possible. For instance, in the rapidly emerging market of IoT, the power consumption has to be minimized such that a sensor node battery is made to sustain for several years.

In the past two decades, the designers have come up with multiple techniques to achieve reduction of power consumption of digital systems. Few techniques use a concept of approximate computing for reducing the power consumption. These techniques exploit an inherent error-tolerance nature of different applications in the digital system in order to reduce the power consumption. The examples of the applications include but are not limited to media processing and recognition (audio, video, and image), and data mining. One of the common features of these applications is that approximate results are acceptable due to either the limitations of human perceptions or the redundancy that is found in larger volumes of data. The techniques of approximate computing help to reduce the power consumption of the digital systems by taking advantage of this feature. By determining maximum tolerable level of error as a given design constraint, approximated circuit designs with a lower energy consumption is often achieved.

Generally, there are two methods for performing approximate computing in digital systems. A first method is performed by applying approximate computing on software. The approximate computing is performed on software by intentionally making algorithmic changes to the software codes. The algorithmic changes are applied to the software codes that compromise accuracy of the final results by decreasing the amount of computations thereby reducing the power consumption. A second method is performed by applying approximate computing on hardware components of the digital system. The approximate computing is applied on hardware components by removing or modifying components of a circuit in order to reduce power consumption. The modification is performed either at circuit level or at higher levels by changing the HDL description of the design. However, the possibility or practicality of applying approximate computing on reconfigurable architectures for reducing power consumption is not considered in any prior arts.

One of the most common types of reconfigurable device (integrated circuits) that is widely used in digital systems (both embedded and otherwise) is a device called Field Programmable Gate Array (FPGA). The FPGA includes array of programmable gates that are configured by a designer to be used in different fields. Therefore, FPGAs have become an essential and indispensable choice in hardware design of modern digital systems. However, the major drawback of FPGAs is their considerably high power consumption. Many significant efforts were made to reduce the power consumption of FPGA, but were in vain. Therefore, the FPGAs are not widely used in embedded systems designs or IoT applications.

Hence, there is a need for applying approximate computing to internal design of a reconfigurable device in order to reduce power consumption. There is also a need for reducing power consumption of reconfigurable device such as FPGA without any necessary or required intervention of a designer. Further, there is a need for development of an algorithm for applying approximate computing on reconfigurable devices.

The above-mentioned shortcomings, disadvantages, and problems are addressed herein and which will be understood by reading and studying the following specification.

OBJECTIVES OF THE EMBODIMENTS HEREIN

The primary object of the embodiments herein is to provide a method for applying approximate computing to an internal design of a digital system (reconfigurable device) to reduce power consumption of reconfigurable devices such as FPGA.

Another object of the embodiments herein is to provide a method for reducing power consumption of reconfigurable device such as FPGA without any (necessary or required) intervention of a designer.

Yet another object of the embodiments herein is to develop an algorithm for applying approximate computing on reconfigurable devices.

Yet another object of the embodiments herein is to develop a method to calculate an overall error occurring before and after applying an algorithm for applying approximate computing, based on individual errors.

Yet another object of the embodiments herein is to integrate an algorithm for applying approximate computing algorithm into the existing commercial FPGA design automation tools.

Yet another object of the embodiments herein is to provide a method of applying approximate computing by slightly changing contents of programmable components (LUTs) in the reconfigurable devices.

Yet another object of the embodiments herein is to provide a method for enabling designer of the digital systems to reduce the power consumption using simulation and synthesis tools.

These and other objects and advantages of the embodiments herein will become readily apparent from the following detailed description taken in conjunction with the accompanying drawings.

SUMMARY

The embodiments herein provide a method for applying approximate computing to digital systems for reducing the dynamic power consumption. The approximate computing is applied by introducing an error into a Look Up Table (LUT) or an intermediate LUT based on a theory of approximation, while ensuring that total error does not exceed the maximum possible error rate. The approximate computing is applied by using a standalone simulation tool or by integrating the function of approximate computing onto an existing simulation tool. The method requires minimal intervention of user. The intervention of user is required only during a feeding/supplying of the inputs.

According to an embodiment herein, a method for applying approximate computing to internal circuits of a digital system is disclosed. The method includes writing a description of the internal circuit of the digital system. The digital system is an LUT based reconfigurable devices such as a Field Programmable Gate Array (FPGA). The method includes generating a bit stream containing information regarding the contents of a programmable component such as Look Up Table (LUT) and the connection between multiple LUTs. The bit stream is the entries in the LUT. The FPGA is configured/designed by implementing an exact design using an FPGA design tool. Further, the method includes providing an input, the bit stream and FPGA to a design platform. The input includes a plurality of parameters including but not limited to a maximum possible error rate, forbidden points and likelihood of change of inputs. The input is derived from the description of the internal circuit by a designer (user). Furthermore, the method includes manipulating the bit stream to create the FPGA in an approximate design for reducing the dynamic power consumption of the digital system. The bit stream is manipulated by injecting/introducing an error on a single LUT or an intermediate LUT based on a theory of approximation, and wherein the error introduced is calculated/estimated to ensure that total error does not exceed the maximum possible error rate.

According to an embodiment herein, the error is introduced on the LUT based on the theory of approximation by changing entries of a row in the LUT with highest probabilities of value 0 to 1 when the probability of bit '0' is less than probability of bit '1'. The error is introduced by changing entries of a row with highest probabilities of value 1 to 0 when the probability of bit '0' is greater than probability of bit '1'. Further the error is introduced by changing entries of a row with highest probabilities of value 1 to 0 or vice versa when the probability of bit '0' is equal to probability of bit '1'.

According to an embodiment herein, the error is introduced/injected on an intermediate LUT when none of the either changes in the output of the LUT satisfies the error constraint.

According to an embodiment herein, the LUT for injecting error among a cascaded LUT is the one that creates the minimum number of observable error pairs in subsequent LUT.

According to an embodiment herein, the bit stream is modified based on an increase in probability of occurrence of bit '0' and probability of occurrence of bit '1' in the LUTs.

According to an embodiment herein, the method for applying approximate computing is applicable to all types of digital systems including reconfigurable or reprogrammable devices.

According to an embodiment herein, the approximate design is introduced into the exact design description at any one of a plurality of mutually different levels of abstraction and design, selected from a group consisting of schematic, gate, structure, data flow, RTL, and system.

According to an embodiment herein, the method for applying approximate computing is performed by any one of a standalone tool used as an add-on with the existing simulation, synthesis and/or placement tools or the method for applying approximate computing is integrated into the existing simulation, synthesis and/or placement tools.

According to an embodiment herein, the method for applying approximate computing is performed by a standalone simulation, synthesis and/or placement tool operating in tandem with or independently from other existing simulation, synthesis and/or placement tools. Further, the method is performed by a standalone simulation, synthesis and/or placement tool operating independently and in communication with the existing simulation, synthesis and/or placement tools behind a graphical user interface. Further, the method is performed by a simulation, synthesis and/or placement tool integrated into existing simulation, synthesis and/or placement tools.

According to an embodiment herein, the approximate design is a software code comprising a set of specific design characteristics including error rate, power consumption, and speed.

According to an embodiment herein, the method for applying approximate computing leads to a reduction of resources (area) and/or delay of the final circuit implemented on a reconfigurable architecture.

According to an embodiment herein, the method for applying approximate computing requires manual intervention of designer only for identifying the plurality of parameters based on the description of the original design.

According to an embodiment herein, the method for applying approximate computing is performed on reconfigurable devices with design object of minimizing the dynamic power consumption with a constraint of the maximum error rate.

According to an embodiment herein, the method for applying approximate computing is performed on reconfigurable devices with design objective of minimizing the error rate while maintaining design constraint of the power consumption under a given amount.

These and other aspects of the embodiments herein will be better appreciated and understood when considered in conjunction with the following description and the accompanying drawings. It should be understood, however, that the following descriptions, while indicating the preferred embodiments and numerous specific details thereof, are given by way of an illustration and not of a limitation. Many changes and modifications may be made within the scope of the embodiments herein without departing from the spirit thereof, and the embodiments herein include all such modifications.

BRIEF DESCRIPTION OF THE DRAWINGS

The other objects, features, and advantages will be apparent to those skilled in the art from the following description of the preferred embodiment herein and the accompanying drawings in which.

Although the specific features of the embodiments herein are shown in some drawings and not in others. This is done for convenience only as each feature may be combined with any or all of the other features in accordance with the embodiments herein.

DETAILED DESCRIPTION OF THE EMBODIMENTS HEREIN

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The embodiments herein provide a method for applying approximate computing to digital systems for reducing the dynamic power consumption. The approximate computing is applied by introducing error into a Look Up Table (LUT) or an intermediate LUT based on a theory of approximation, while ensure that total error does not exceed the maximum possible error rate. The approximate computing is applied by using a standalone simulation tool or by integrating the function of approximate computing onto an existing simulation tool. The method requires minimal intervention of user. The intervention of user is required only while providing the inputs.

According to an embodiment herein, a method for applying approximate computing to internal circuits of a digital system is disclosed. The method includes writing a description of the internal circuit of the digital system. The digital system is an LUT based reconfigurable device such as a Field Programmable Gate Array (FPGA). The method includes generating a bit stream containing information regarding contents of a programmable component such as Look Up Table (LUT) and the connection between multiple LUTs. The method further includes generating an approximate FPGA design by implementing exact design using an FPGA design tool. Further, the method includes providing an input, the bit stream and FPGA to a design platform. The input includes a plurality of parameters including but not limited to a maximum possible error rate, forbidden points and likelihood of change of inputs. The input is derived from the description of the internal circuit by a designer (user). Furthermore, the method includes manipulating the bit stream to create the FPGA in an approximate design for reducing the dynamic power consumption of the digital system. The bit stream is manipulated by injecting/introducing an error on a single LUT or an intermediate LUT based on a theory of approximation, wherein the error introduced is calculated/estimated to ensure that total error does not exceed the maximum possible error rate.

According to an embodiment herein, the error is introduced on the LUT based on the theory of approximation and is performed by changing entries of a row in the LUT with highest probabilities of value 0 to 1 when the probability of bit '0' is less than probability of bit '1'. The error is introduced by changing entries of a row with highest probabilities of value 1 to 0 when the probability of bit '0' is greater than probability of bit '1'. Further the error is introduced by changing entries of a row with highest probabilities of value 1 to 0 or vice versa when the probability of bit '0' is equal to probability of bit '1'.

According to an embodiment herein, the error is introduced/injected on an intermediate LUT when none of changes in the output LUT satisfies the error constraint.

According to an embodiment herein, the LUT for injecting error among a cascaded LUT is the one that creates minimum number of observable error pairs in subsequent LUT.

According to an embodiment herein, the bit stream is modified based on an increase in probability of occurrence of bit '0' and probability of occurrence of bit '1' in the LUTs.

According to an embodiment herein, the method for applying approximate computing is applicable to all types of digital systems including reconfigurable or reprogrammable devices.

According to an embodiment herein, the approximate design is introduced into the exact design description at one of different levels of abstraction and design, selected from a group consisting of schematic, gate, structure, data flow, RTL, and system.

According to an embodiment herein, the method for applying approximate computing is performed by one of a standalone tool used as an add-on with the existing simulation, synthesis and/or placement tools or is integrated into the existing simulation, synthesis and/or placement tools.

According to an embodiment herein, the method for applying approximate computing is performed by one of a standalone simulation, synthesis and/or placement tool operating in tandem with and independent from other existing simulation, synthesis and/or placement tools. Further, the method is performed by a standalone simulation, synthesis and/or placement tool operating independently and in communication with the existing simulation, synthesis and/or placement tools behind a graphical user interface. Further, the method is performed by a simulation, synthesis and/or placement tool integrated into existing simulation, synthesis and/or placement tools.

According to an embodiment herein, the approximate design is a software code comprising a set of specific design characteristics including error rate, power consumption, and speed.

According to an embodiment herein, the method for applying approximate computing leads to a reduction of resources (area) and/or delay of the final circuit implemented on a reconfigurable architecture.

According to an embodiment herein, the method for applying approximate computing requires manual intervention of designer only for identifying the plurality of parameters based on the description of the original design.

According to an embodiment herein, the method for applying approximate computing is performed on reconfigurable devices with design object of minimizing the dynamic power consumption with a constraint of the maximum error rate.

According to an embodiment herein, the method for applying approximate computing is performed on reconfigurable devices with design objective of minimizing the error rate while maintaining design constraint of the power consumption under a given amount.

A method for applying approximate computing to internal circuit of a digital system, the method comprises the following steps. Initially, a description of the internal circuit of the digital system is written/defined. The digital system is a Look Up Table (LUT) based reconfigurable devices such as a Field Programmable Gate Array (FPGA). A bit stream is generated to contain information regarding contents of a programmable component such as LUT and the connection between multiple LUTs. An FPGA with an exact design is generated using an FPGA design tool. An input, the bit stream and the designed FPGA are fed to a synthesis platform, and wherein the input includes a plurality of parameters including a maximum possible error rate, forbidden points and likelihood of change of inputs, and wherein the input is derived from a description of the internal circuit by a designer. The bit stream is manipulated to create the FPGA with an approximate computing design for reducing the dynamic power consumption of the digital system, and wherein the bit stream is manipulated by injecting/introducing an error on the LUT based on a theory of approximation, and wherein the error introduced is calculated/estimated to ensure that total error does not exceed the maximum possible error rate, and wherein a calibrated level of approximation is introduced into an original/actual design of FPGA devices.

According to an embodiment herein, the step of introducing error on the LUT based on the theory of approximation comprises changing entries of a row in the LUT with highest probabilities of value 0 to 1 when the probability of bit '0' is less than probability of bit '1'; changing entries of a row with highest probabilities of value 1 to 0 when the probability of bit '0' is greater than probability of bit '1'; and changing entries of a row with highest probabilities of value 1 to 0 or vice versa when the probability of bit '0' is equal to probability of bit '1'.

According to an embodiment herein, wherein the error is introduced/injected on an intermediate LUT when none of changes in the output LUT satisfies the error constraint.

According to an embodiment herein, wherein the error is introduced on the LUT among a cascaded LUT by identifying the LUT that creates the minimum number of observable error pairs in subsequent LUT.

According to an embodiment herein, wherein the bit stream is modified based on an increase in probability of occurrence of bit '0' and probability of occurrence of bit '1' in the LUTs.

According to an embodiment herein, wherein the approximate computing is applied on a plurality of types of digital systems, and wherein the plurality of digital systems includes reconfigurable or reprogrammable devices.

According to an embodiment herein, wherein the approximate design is introduced into the exact/actual design description at any one of a plurality of mutually different levels of abstraction and design, selected from a group consisting of schematic, gate, structure, data flow, RTL, and system.

According to an embodiment herein, wherein a standalone tool is used as an add-on with the existing simulation, synthesis and/or placement tools or a standalone tool is integrated into the existing simulation, synthesis and/or placement tools for applying approximate computing.

According to an embodiment herein, wherein a standalone simulation, synthesis and/or placement tool is operated in tandem with and independently from other existing simulation, synthesis and/or placement tools applying approximate computing using an algorithm.

According to an embodiment herein, wherein a standalone simulation, synthesis and/or placement tool is operated independently and in communication with the existing simulation, synthesis and/or placement tools behind a graphical user interface for applying approximate computing using an algorithm.

According to an embodiment herein, wherein a simulation, synthesis and/or placement tool is integrated into existing simulation, synthesis and/or placement tools and operated for applying approximate computing using an algorithm.

According to an embodiment herein, wherein the approximate design is a software code comprising a set of specific design characteristics including error rate, power consumption, and speed.

According to an embodiment herein, the method comprises reducing resources (area) and/or delay of a final circuit of FPGA implemented on a reconfigurable architecture According to an embodiment herein, the method further comprises identifying the plurality of parameters based on the description of the original design with a minimal manual intervention of designer According to an embodiment herein, the method comprises minimizing a power consumption dynamically with a constraint on the maximum error rate.

According to an embodiment herein, the method comprises minimizing the error rate while maintaining design constraint of the power consumption under a given amount.

According to an embodiment herein, wherein an approximate design is formed as a soft IP core with a preset design characteristics, and wherein the preset design characteristics comprises error rate, power consumption, and speed.

Figure 1:
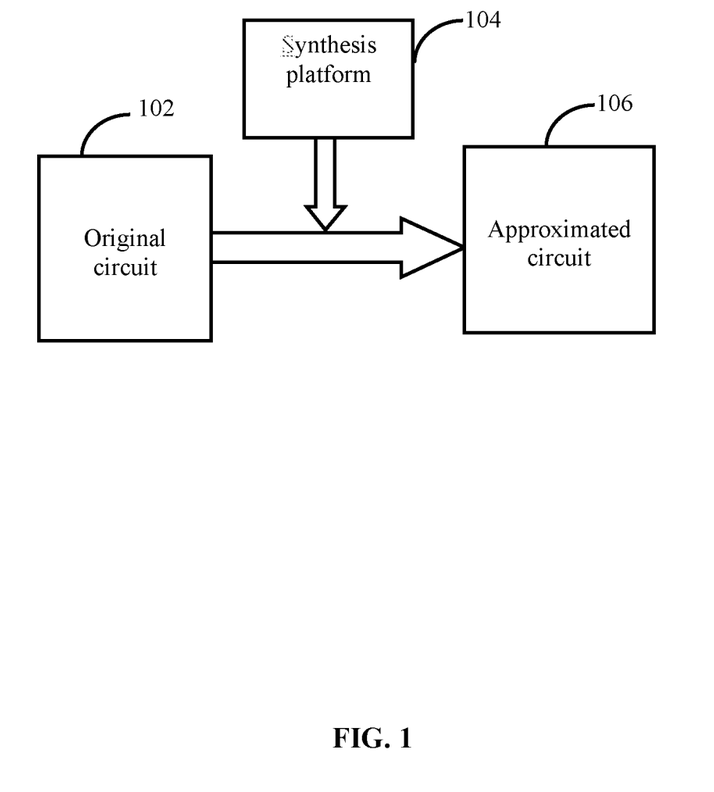
FIG. 1 illustrates a process flow diagram of the method for applying approximate computing to internal circuits of a digital system, according to one embodiment herein.

FIG. 1 illustrates a process flow diagram of the method for applying approximate computing to internal circuits of digital system, according to one embodiment herein. The digital system is a Look up Table (LUT) based reconfigurable device (FPGA). The method converts the original circuit (design) to an approximate equivalent circuit using a synthesis platform in order to reduce/minimize dynamic power consumption of the digital system.

The process flow diagram comprises an original circuit 102 of the digital system. The method includes firstly identifying the description of the original circuit 102 by a designer (user). The designer sets a plurality of parameters including but not limited to a maximum possible error rate, forbidden points (if any) and likelihood of change of inputs, based on the description of the original circuit 102. The forbidden points are points of the circuit that should not be changed during the process.

Further the original circuit 102 is approximated using a synthesis platform 104. The synthesis platform 104 is created by adding feature of approximate computing to existing simulation and synthesis tools. The existing simulation and synthesis tools include but are not limited to ISE, Vivado and Quartus and the like. The synthesis platform 104 identifies LUT or LUTs having entries that could be altered to introduce error while reducing dynamic power consumption. The error that is introduced is calculated/estimated to ensure that total error does not exceed the maximum possible error rate. The method therefore also includes steps of error estimation. The error is further introduced into certain parts of the original circuit 102 to reduce the dynamic power consumption.

The synthesis platform 104 initially receives a bit stream generated by the existing simulation and synthesis tools. Further the synthesis platform 104 makes certain modifications in the bit stream in order to reduce the overall power consumption of the digital system by introducing error. The bit stream is modified based on an increase in probability of occurrence of '0' and probability of occurrence of '1' in the LUTs. The dynamic power consumption of a digital system is proportion to the number of times of transitions from 0 to 1 and vice versa in a bit stream. The number of transitions is normalized to form a parameter called activity factor α. Therefore, if the coefficient α is reduced, power consumption is reduced.

The bit stream is modified to reduce the dynamic power consumption due to the reason that the dynamic power consumption is calculated on the basis of Equation 1, $$Pd = V_{DD}^2 \times f \times C_L \times \alpha \quad (1)$$

Where, α is the activity factor, f is the operating frequency of the circuit, $V_{DD}$ is the supply voltage of the circuit, and $C_L$ is the capacitance of the output.

The original circuit 102 is converted to an approximate circuit 106 to reduce power consumption by using synthesis platform 104. The method of applying approximate computing requires manual intervention of designer only for identifying the parameters such as maximum possible error rate, forbidden points and likelihood of change of inputs, based on the description of the original circuit 102.

Figure 2A:
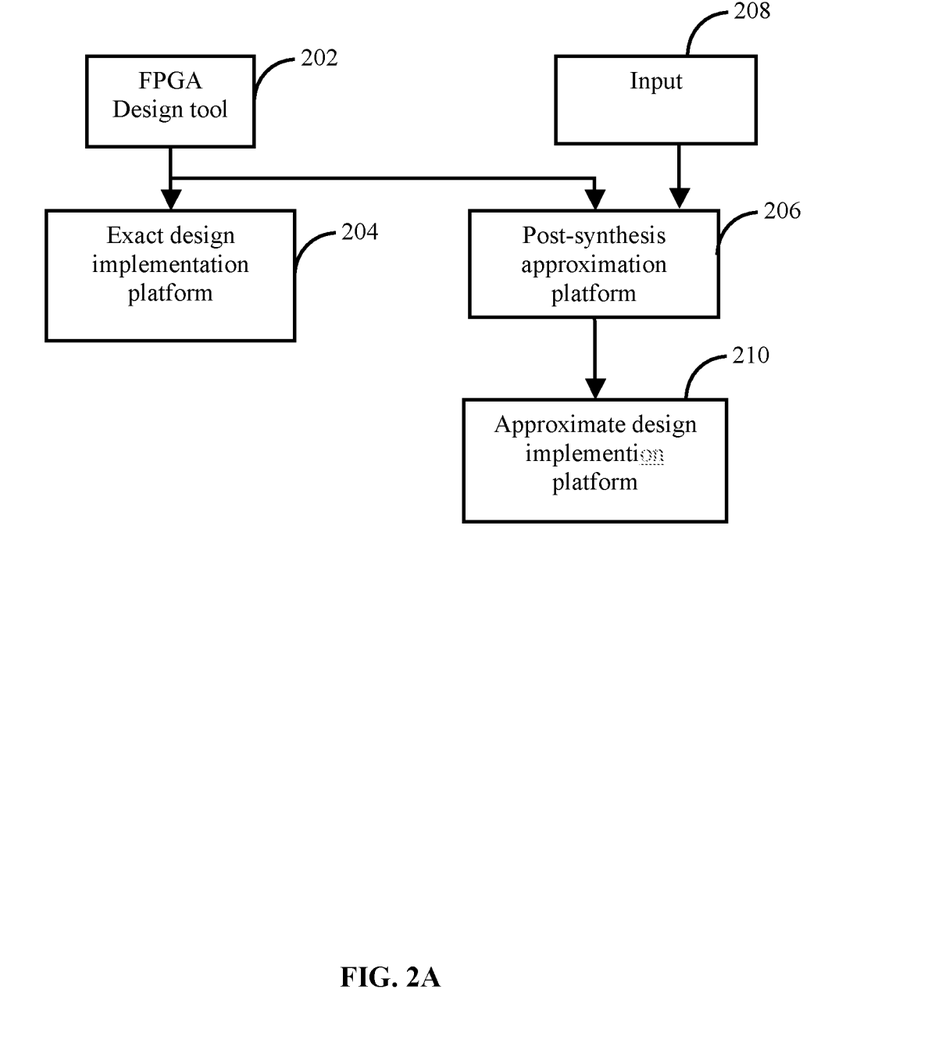
FIG. 2A illustrates a functional block diagram of the method for applying approximate computing to internal circuits of a digital system, according to one embodiment herein.

FIG. 2 illustrates a functional block diagram of the method for applying approximate computing to internal circuits of a digital system (FPGA), according to one embodiment herein. The functional block diagram comprises an FPGA design tool 202. The FPGA design tool includes but is not limited to ISE, Vivado and Quartus and the like. The process of applying approximate computing to the internal circuits of the digital system (FPGA) starts with writing a Register Transfer Level (RTL) description of the internal circuit of the digital system. The RTL description is used in hardware description languages to create a software program or high level representation of the internal circuits of the digital system. The software program created using the RTL description is used to generate a bit stream containing all information regarding the contents of Look Up Table (LUT) and the connection between multiple LUTs. Further, the bit stream is provided to the design implementation platform 204. The bit stream is configured on the FPGA using the FPGA design tool 202 to generate an FPGA with exact design. Thus, the FPGA design tool designs the FPGA at the RTL level.

Further, the bit stream generated is provided to the post-synthesis approximation platform 206. The FPGA with exact design is also provided to the post-synthesis approximation platform 206. Further, the post-synthesis approximation platform 206 also receives input 208. The input 208 comprises a plurality of parameters including but not limited to a maximum possible error rate, forbidden points and likelihood of change of inputs. The input 208 is derived from the description of the internal circuit by a designer (user).

The post-synthesis approximation platform 206 manipulates the bit stream to create the FPGA with an approximate design. The post-synthesis approximation platform generates a method/approach for injecting error on intermediate LUT. The method presents a first algorithm that takes an arbitrary design considering the maximum permissible error rate as a constraint. The first algorithm converts the exact design into an approximate design with error not exceeding the given constraint while reducing the dynamic power consumption of the digital system. The LUT or LUTs whose entry(ies) are altered in order to introduce error while reducing dynamic power is identified based on a theory of approximation (Theorem 1). Further, the method inevitably comprises a mechanism to calculate the introduced error to ensure that the total error does not exceed the given constraint. Therefore, a method for error estimation is also incorporated in the proposed method.

Figure 2B:
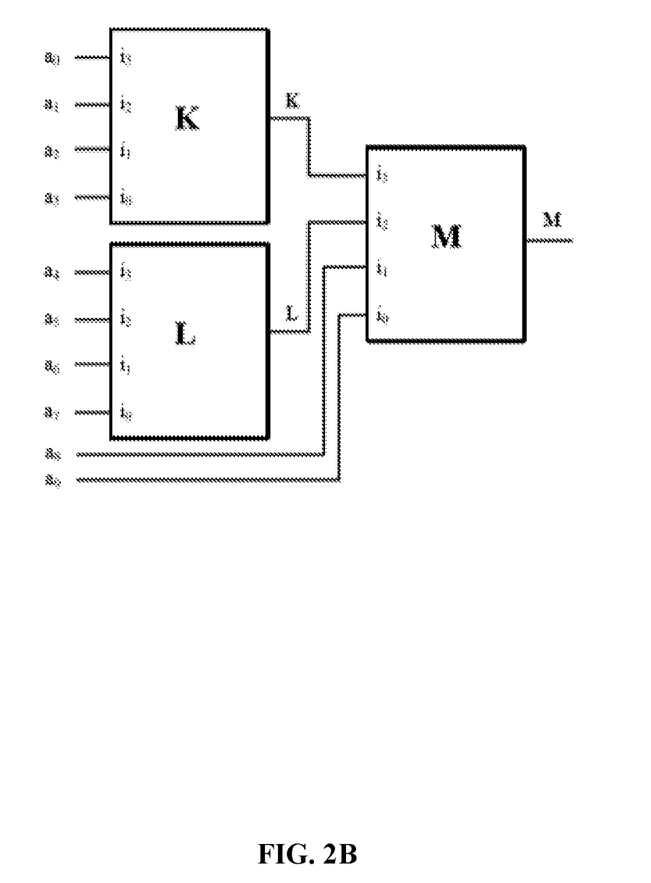
FIG. 2B illustrates a design of a reconfigurable device with three 4-input LUTs, according to one embodiment herein.

The theory of approximation is as follows. In order to explain the theory, behavior of a logic circuit described by a truth table using probabilistic modeling is considered. If the logic circuit is implemented on an LUT, then the truth table describing the behavior of the logic circuit will exactly match the LUT contents. By knowing the probabilities of the events at inputs of an LUT, probabilities of output entries of that LUT are calculated. To explain the theory of approximation consider a design with ten primary inputs (PIs) implemented by three 4-input LUTs, called K, L and M. The design having three 4-input LUTs, called K, L and M is depicted in FIG. 2B. Table I, provided below shows the contents of the LUTs along with the probabilities of each row based on the assumption that each PI has a 50% chance of being 0 or 1.

TABLE I

| | $I_3 I_2 I_1 I_0$ | K | L | M | $P_K$ | $P_L$ | $P_M$ |
|---|---|---|---|---|---|---|---|
| $M_0$ | 0 0 0 0 | 0 | 0 | 0 | 0.0625 | 0.0625 | 0.0684 |
| $M_1$ | 0 0 0 1 | 0 | 1 | 0 | 0.0625 | 0.0625 | 0.0684 |
| $M_2$ | 0 0 1 0 | 1 | 1 | 1 | 0.0625 | 0.0625 | 0.0684 |
| $M_3$ | 0 0 1 1 | 1 | 1 | 0 | 0.0625 | 0.0625 | 0.0684 |
| $M_4$ | 0 1 0 0 | 0 | 0 | 1 | 0.0625 | 0.0625 | 0.0410 |
| $M_5$ | 0 1 0 1 | 1 | 0 | 1 | 0.0625 | 0.0625 | 0.0410 |
| $M_6$ | 0 1 1 0 | 0 | 0 | 1 | 0.0625 | 0.0625 | 0.0410 |
| $M_7$ | 0 1 1 1 | 0 | 1 | 1 | 0.0625 | 0.0625 | 0.0410 |
| $M_8$ | 1 0 0 0 | 1 | 0 | 0 | 0.0625 | 0.0625 | 0.0879 |
| $M_9$ | 1 0 0 1 | 0 | 0 | 1 | 0.0625 | 0.0625 | 0.0879 |
| $M_{10}$ | 1 0 1 0 | 1 | 0 | 0 | 0.0625 | 0.0625 | 0.0879 |
| $M_{11}$ | 1 0 1 1 | 0 | 0 | 0 | 0.0625 | 0.0625 | 0.0879 |
| $M_{12}$ | 1 1 0 0 | 1 | 0 | 1 | 0.0625 | 0.0625 | 0.0527 |
| $M_{13}$ | 1 1 0 1 | 1 | 1 | 1 | 0.0625 | 0.0625 | 0.0527 |
| $M_{14}$ | 1 1 1 0 | 1 | 0 | 0 | 0.0625 | 0.0625 | 0.0527 |
| $M_{15}$ | 1 1 1 1 | 1 | 1 | 1 | 0.0625 | 0.0625 | 0.0527 |

Based on the probabilities listed in Table I, the following values are obtained:

$$P_k(\text{Out}=0)=0.4375, \Delta\text{Prob}_k=0.1250$$

$$P_L(\text{Out}=0)=0.6250, \Delta\text{Prob}_k=0.2500$$

$$P_M(\text{Out}=0)=0.5215, \Delta\text{Prob}_k=0.0430 \quad (1)$$

The relationship between a function's dynamic power consumption and parameter $\Delta\text{Prob}_F$ is explained as follows. Firstly consider the case when the error is injected on the output LUT, (i.e., an LUT without a successor). Consider the dynamic power consumption in a single LUT design The dynamic power consumption of a digital circuit is calculated as:

$$P_d = CV_{DD}^2 f\alpha \quad (2)$$

Where C represents load circuit capacitance, $V_{DD}$ represents supply voltage, f is the clock frequency of circuit and α is the probability that a clock event results in a 0→1 (or power consuming) event at the output of the logic circuit.

For an arbitrary gate:

$$\alpha = \text{Probability of 0} \times \text{Probability of 1} \quad (3)$$

For an LUT, equation (3) takes the following form:

$$\alpha = P(\text{Out}=0) \times P(\text{Out}=1) \quad (4)$$

Therefore, the equation 4 shows that there is a direct relationship between the dynamic power consumption and the product of probabilities whose output is 0 or 1. Consider an arbitrary function F implemented by a single LUT, then the dynamic power consumption of the circuit is inversely proportional to $\Delta\text{Prob}_F$. In order to minimize the product of two numbers, the difference between them has to be minimized. Therefore, since $P_F(\text{Out}=0)$ and $P_F(\text{Out}=1)$ are positive real numbers whose sum is always 1, then their product, i.e., α is minimum when $\Delta Prob_F$ is maximum.

$$\Delta Prob_F = |P_F(Out=0) - P_F(Out=1)| \qquad (5)$$

Using equations 2 and 3, it can be deduced that for a single LUT, the dynamic power consumption is minimum when $\Delta Prob_F$ is maximum. That is, the dynamic power consumption is inversely proportional to $\Delta Prob_F$.

$$P_d(F) = Const./\Delta Prob_F \qquad (6)$$

Where Const. is a constant directly proportional to f, VDD and C.

The entries in the LUT are altered based on the theory of approximation. The LUT contains same information as the truth table. The entries of the LUT are altered by changing a row or a group of rows in the LUT. This is known as a truth table alteration error. The truth table alteration error is represented by $N_{mi, 1-0}$, which indicates that the i-th minterm of LUT N is changed from 1 to 0. For an arbitrary non-identity LUT the error injection scenario that reduces power consumption is as follows. The non-identity LUT is an LUT in which all truth table entries are not the same (either all 1 or all 0).

If F is a non-identity LUT, then $0 < P_F(Out=0) < 1$ and $0 < P_F(Out=1) < 1$. Consider a scenario where $P_F(Out=0) < P_F(Out=1)$, then select the row that has entry of 0 value with the highest probability and alter the entry value to 1. When the entries are altered, there is a decreases in $P_F(Out=0)$ and an increase in $P_F(Out=1)$, thereby increasing the $\Delta Prob_F = |P_F(Out=0) - P_F(Out=1)|$. Thus the dynamic power is reduced as the dynamic power is inversely proportional to $\Delta Prob_F$.

In another scenario, if $P_F(Out=1) < P_F(Out=0)$, then the row having entries of value 1 with the highest probability is selected and the entries of value 1 is altered to value 0. This increases the value of $\Delta Prob_F$ thereby decreasing the dynamic power.

In yet another scenario, if $P_F(Out=0) = P_F(Out=1) = 0.5$, then the row with the maximum probability (regardless of its value) is identified. Further the value of entries in the row is altered to maximize $\Delta Prob_F$ thereby minimizing the dynamic power.

In another exemplary scenario, to demonstrate Theorem of approximation, consider LUT M in FIG. 2B. Recalling that $P_M(Out=0) = 0.5215$ and $P_M(Out=1)$ 0.4785, a row having entries of value 1 has to be altered to value 0. From table I, it is understood that row 9 is having highest probability among the rows with a value of 1. Therefore, an error is injected on row 9 that increases $\Delta Prob_F$ from 0.0430 to 0.2188. The value of $P_{0 \to 1}$ in equation (2) is found to be 0.2495 and 0.2380 before and after the error injection, respectively. The change in the value represents 4.6% reduction in dynamic power consumption of the LUT.

Further, for a given particular error constraint, the process of choosing the minterm that needs to be altered is very straightforward. The minterm that needs to be altered is chosen by looking at probability table and readily finding the best row(s) to inject an error while meeting the error constraint. The percentage of error is equal to the probability of each row multiplied by 100. In an exemplary scenario, consider that the error constraint set by the designer is 7%. From table I, it is understood that injecting an error on row 9 ($M_{m9; 1 \to 0}$) will exceed the error constraint set by the designer. In table I, the next choice that provides the highest power reduction while meeting the error constraint is row 2 ($M_{m2; 1 \to 0}$) for which an error of 100×0.0684=6.84% is calculated. By altering the entries in the row 2, the LUT achieves power savings of 3%. Therefore, even though error injection on row 9 provides a higher power reduction compared to row 2, the row 2 is selected as selecting the row 9 exceeds the given error constraint. Further, if the error constraint set by the designer is 16%, then both the row 9 and the row 2 are selected and altered, as the reduction in power consumption achieved by altering row 9 and row 2 is 12.5% and the overall power savings achieved is 5.7%.

Thus, injecting error into the output of the LUT causes the following scenarios to occur. In some cases, none of the change in the output of LUT would satisfy the error constraint. In some other cases, even though the algorithm finds output LUT alteration(s) that satisfy the error constraint, expanding the approximation to preceding LUTs might provide further power savings without increasing the induced error beyond the maximum constraint.

Now injecting error into an LUT among multiple LUTs are considered. In multiple LUTs, error is injected to an LUT whose output is not a primary output of the LUT. Such LUTs are referred to as intermediate LUTs. In an exemplary embodiment, assume that the maximum error constraint is 3%. In such as case, none of the error injection scenario in LUT M would satisfy the error constraint. Therefore, an intermediate LUT(s) needs to be altered to find an acceptable error.

Consider the intermediate LUT K, referring to FIG. 2B. When the first row of LUT K is changed from 0 to 1, the input $i_3$ of LUT M is altered. Since $i_3$ is the MSB of M, a change from 0 to 1 maps the first 8 rows of LUT M ($M_{m0}, M_{m1}, M_{m7}$) to its second 8 rows ($M_{m8}, M_{m9}, \ldots, M_{m15}$). The overall impact on the LUT M depends on the number of differences among the first 8 minterms and their counterparts among the second 8 minterms. From Table I, the values of $M_{m1}, M_{m2},$ and $M_{m6}$ are different from $M_{m9}, M_{m10}, M_{m14}$, respectively. Here two types of errors occur. The first type of error is an observable error and the second type of error is an unobservable error. For example, if the inputs of K are such that $m_0$ is chosen and input $i_2 i_1 i_0$ of LUT M is 001, then the output of M will show a 1 (the value of $M_{m9}$) instead of 0 (the value of $M_{m1}$), thereby causing the observable error. Similarly $M_{m1}, M_{m2},$ and $M_{m6}$ contain observable errors. On the other hand, if other inputs of LUT M ($i_2 i_1 i_0$) are 011, then the output will show $M_{m11}$ instead of $M_{m3}$. Since the values of $M_{m3}$ and $M_{m11}$ are the same, the injected error will not be observable at the output, thereby causing an unobservable error.

In order to obtain the overall output error, consider one of the observable errors, say $M_{m1}$. The effect of $M_{m1}$ being mapped on $M_{m9}$ is observable only when the other three inputs of LUT M ($i_2 i_1 i_0$) are 001. From Equation (1), the probability of $i_2$ being 0 is $P_L(Out=0) = 0.6250$. The $i_1$ and $i_0$ inputs of LUT M are PIs. Therefore, the probability of $i_2 i_1 i_0 = 001$ is equal to $(0.625)(0.5)(0.5) = 0.1563$. Since only one minterm of LUT K has been changed, the probability of observing $M_{m9}$ instead of $M_{m1}$ is $(0.1563)(1/16) = 0.0098$. The probability of $M_{m1}$ for $K_{m9; 1 \to 0}$ is depicted graphically as below:

The probabilities of other observable errors are calculated and listed in Table II below. The overall error provided in the Table II is computed by adding the individual probabilities of each observable error. The error rate/percentage of error is equal to the probability times 100.

TABLE II

| MAPPING | $i_3\ i_2\ i_1\ i_0$ | PROBABILITY |
|---|---|---|
| $M_{M1} \rightarrow M_{M9}$ | 0 0 0 1 | 0.0098 |
| $M_{M2} \rightarrow M_{M10}$ | 0 0 1 0 | 0.0098 |
| $M_{M6} \rightarrow M_{M14}$ | 1 1 1 0 | 0.0059 |
| | 0 1 1 0 | |
| TOTAL ERROR PROBABILITY OF $K_{m0;\ 1 \rightarrow 0}$ | | 0.0255 |
| ERROR RATE | | 2.55% |

TABLE III

| | $\alpha = P\ (Out = 0) \times P\ (Out = 1)$ | |
|---|---|---|
| LUT | Original | After $K_{m0;\ 1 \rightarrow 0}$ |
| K | 0.4375 0.5625 = 0.2461 | 0.3750 0.6250 = 0.2344 |
| L | 0.6250 0.3750 = 0.2344 | 0.6250 0.3750 = 0.2344 |
| M | 0.5215 0.4785 = 0.2495 | 0.5273 0.4727 = 0.2493 |
| Total | 0.7300 | 0.7183 |
| | Power Saving (1 − (0.7183/0.7300)) 100 = 1.6% | |

The impact of $K_{m0;\ 1 \rightarrow 0}$ on power consumption is assessed by recalculating the $\alpha$ of all LUTs after injecting the error and compare the total with the original $\alpha$. Table III provides power saving calculation for intermediate LUT error injection. It is observed from the table III that the impact resulted in 1.6% power reduction while creating 2.55% error at the output which is less than the maximum allowed error rate of 3%. Tables 2 and 3 show that injecting error into intermediate LUTs cause no change in the output LUT while satisfying a stringent error constraint. In order to understand the steps to choose the target intermediate LUT for error injection to minimize the error impact on the circuit output, consider two cascaded LUTs. The first LUT is termed as candidate and the second LUT is termed as subsequent LUT. Table IV represents the mapping patterns in the minterms of the subsequent LUT depending on which input is connected to the output of candidate LUT. For instance, in consider that in FIG. 2B candidate LUT (K) was connected to the i3 input of subsequent LUT (M), the leftmost column patterns were observed. If a minterm pair in this table holds the same value, then the mapping will have no impact on the circuit functionality. But if a pair has two different values, an error injected in the candidate LUT will cause an observable error in the subsequent LUT. This is termed as observable error pair. The best candidate LUT for injecting error among a cascaded LUT is usually the one that creates the minimum number of observable error pairs in its subsequent LUT.

TABLE IV

| $i_3$ | $i_2$ | $i_1$ | $i_0$ |
|---|---|---|---|
| $m_0 \leftrightarrow m_8$ | $m_0 \leftrightarrow m_4$ | $m_0 \leftrightarrow m_2$ | $m_0 \leftrightarrow m_1$ |
| $m_1 \leftrightarrow m_9$ | $m_1 \leftrightarrow m_5$ | $m_1 \leftrightarrow m_3$ | $m_2 \leftrightarrow m_3$ |
| $m_2 \leftrightarrow m_{10}$ | $m_2 \leftrightarrow m_6$ | $m_4 \leftrightarrow m_6$ | $m_4 \leftrightarrow m_5$ |
| $m_3 \leftrightarrow m_{11}$ | $m_3 \leftrightarrow m_7$ | $m_5 \leftrightarrow m_7$ | $m_6 \leftrightarrow m_7$ |
| $m_4 \leftrightarrow m_{12}$ | $m_8 \leftrightarrow m_{12}$ | $m_8 \leftrightarrow m_{10}$ | $m_8 \leftrightarrow m_9$ |
| $m_5 \leftrightarrow m_{13}$ | $m_9 \leftrightarrow m_{13}$ | $m_9 \leftrightarrow m_{11}$ | $m_{10} \leftrightarrow m_{11}$ |
| $m_6 \leftrightarrow m_{14}$ | $m_{10} \leftrightarrow m_{14}$ | $m_{12} \leftrightarrow m_{14}$ | $m_{12} \leftrightarrow m_{13}$ |
| $m_7 \leftrightarrow m_{15}$ | $m_{11} \leftrightarrow m_{15}$ | $m_{13} \leftrightarrow m_{15}$ | $m_{14} \leftrightarrow m_{15}$ |

The search among intermediate LUTs with minimum number of observable error pairs is done exhaustively among all non-output LUTs. The search is recommended to be done among the LUTs that immediately precede the output LUTs. Once the search is done and the candidate LUT is identified, the optimum row to be altered needs to be identified. According to the theory of approximation, if P(Out=0)<P(Out=1) then changing a row with a 0 will result in a lower $\alpha$. Similarly, if P(Out=0)>P(Out=1), then changing a row with a 1 will result in a lower $\alpha$. Further, if P(Out=0)=P(Out=1), changing a 0 to 1 or vice versa does not make any difference. In all the cases, among the minterms having the same value, the one with the highest probability would reduce $\alpha$, the most. The minterm with the highest probability reduces $\alpha$, thereby producing maximum power savings. Further, reducing the power consumption of an intermediate LUT individually does not necessarily reduce the overall circuit power consumption.

Figure 2C:
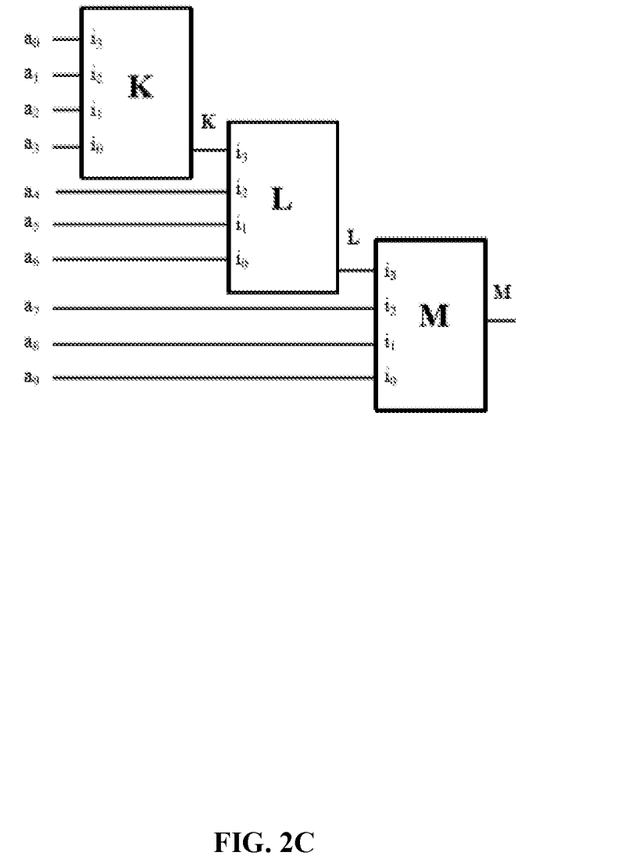
FIG. 2C illustrates a design of a reconfigurable device with three cascaded LUTs, according to one embodiment herein.

Further, the probability of error masking among multiple LUTs is discussed. In order to understand the concept of error masking, consider the following example. Consider the circuit depicted in FIG. 2C in which 3 LUTs are cascaded in series. The contents of the LUTs are listed in Table V. Assume that $K_{m0;\ 1 \rightarrow 0}$ error is injected into K. Since K is connected to $i_3$ input of L, the mapping pattern is like the column $i_3$ of Table IV. The minterms of L that are involved in the mapping also contain the same values i.e. the possible outputs of LUT L are independent of $i_3$ input. Therefore, $K_{m0;\ 1 \rightarrow 0}$ error produces no observable error pair in the target LUT (L). The fact is true regarding errors in any minterms of K. Therefore, even if all minterms of K are turned into 0 or 1, there will be no observable impact on L. This notion is utilized to drastically reduce power consumption in LUT-based designs by allowing to make multiple changes in the design without increasing the error rate.

TABLE V

| | $i_3\ i_2\ i_1\ i_0$ | K | L | M |
|---|---|---|---|---|
| m0 | 0 0 0 0 | 1 | 0 | 1 |
| m1 | 0 0 0 1 | 1 | 1 | 0 |
| m2 | 0 0 1 0 | 0 | 1 | 1 |
| m3 | 0 0 1 1 | 0 | 0 | 1 |
| m4 | 0 1 0 0 | 1 | 1 | 0 |
| m5 | 0 1 0 1 | 0 | 1 | 1 |
| m6 | 0 1 1 0 | 0 | 1 | 1 |
| m7 | 0 1 1 1 | 1 | 1 | 1 |
| m8 | 1 0 0 0 | 0 | 0 | 1 |
| m9 | 1 0 0 1 | 1 | 1 | 0 |
| m10 | 1 0 1 0 | 0 | 1 | 1 |
| m11 | 1 0 1 1 | 1 | 0 | 1 |
| m12 | 1 1 0 0 | 1 | 1 | 0 |
| m13 | 1 1 0 1 | 1 | 1 | 1 |
| m14 | 1 1 1 0 | 1 | 1 | 0 |
| m15 | 1 1 1 1 | 1 | 1 | 0 |

Further, the concept of error masking by multiple errors in multiple LUTs is discussed. Consider the FIG. 2B with a different LUT contents as shown in Table VI. Initially, a suitable change in the output LUT is determined by applying the theory of approximation. The result would create 8.79% error at the output. Further, the percentage of error caused by $M_{m9;\ 1\to0}$ is reduced using the possibility of introducing an additional error in one of the preceding LUT. Now for example, consider the effect of $K_{m2;\ 1\to0}$. The effect of $K_{m2;\ 1\to0}$ reduces the error percentage to 7.81% as shown in Table VII. The error percentage is reduced because after applying the error $P_k(Out=1)$ is reduced to 0.5 which was earlier $P_k(Out=1)$ 0.5625. This in turn lowered the probability of observing $M_{m9}$.

Further before introducing error, the value of $P_k(Out=0)$ is less than $P_k(Out=1)$. A minterm say $K_{m2;\ 1\to0}$ changing from 1 to 0 makes $P_k(Out=0)$ and $P_k(Out=1)$ equal. The power consumption of K would increase when the error rate is reduced. From Table VII in digital system it's clear that where the power saving for $M_{m9;\ 1\to0}$ reduces after injecting $K_{m2;\ 1\to0}$. The power saving for Mm9$_{;\ 1\to0}$ which is 3.26% reduces to 2.43%. If three minterms of K (namely $K_{m2;\ 1\to0}$ $K_{m3;\ 1\to0}$ and $K_{m5;\ 1\to0}$) changes from 1 to 0, then $\alpha$ for K is reduced to 0.2344 and therefore, the power consumption of K is decreased accordingly. Table VIII compares the effects of applying single or multiple errors on local power consumption of LUT K and Table IX shows the total power saving and error rate of $M_{m9}$ caused by $M_{m9;\ 1\to0}$ with and without and $K_{m2,3,5;\ 1\to0}$.

The combination of $M_{m9;\ 1\to0}$ and $K_{m2,3,5;\ 1\to0}$ provides a larger total power saving while causing a smaller overall error rate compared to a single error. Therefore, moving from a single error to multiple errors does not necessarily increase the total error in the circuit as might appear intuitively. In fact, a careful introduction of multiple errors in key points in the circuit may provide more favorable results as compared to a single error.

TABLE VI

| | $i_3\ i_2\ i_1\ i_0$ | K | L | M | $P_K$ | $P_L$ | $P_M$ |
|---|---|---|---|---|---|---|---|
| m0  | 0 0 0 0 | 0 | 0 | 0 | 0.0625 | 0.0625 | 0.0684 |
| m1  | 0 0 0 1 | 1 | 1 | 0 | 0.0625 | 0.0625 | 0.0684 |
| m2  | 0 0 1 0 | 0 | 1 | 1 | 0.0625 | 0.0625 | 0.0684 |
| m3  | 0 0 1 1 | 0 | 0 | 1 | 0.0625 | 0.0625 | 0.0684 |
| m4  | 0 1 0 0 | 1 | 1 | 0 | 0.0625 | 0.0625 | 0.0410 |
| m5  | 0 1 0 1 | 0 | 1 | 1 | 0.0625 | 0.0625 | 0.0410 |
| m6  | 0 1 1 0 | 1 | 1 | 1 | 0.0625 | 0.0625 | 0.0410 |
| m7  | 0 1 1 1 | 1 | 1 | 1 | 0.0625 | 0.0625 | 0.0410 |
| m8  | 1 0 0 0 | 0 | 0 | 1 | 0.0625 | 0.0625 | 0.0879 |
| m9  | 1 0 0 1 | 1 | 1 | 0 | 0.0625 | 0.0625 | 0.0879 |
| m10 | 1 0 1 0 | 0 | 1 | 1 | 0.0625 | 0.0625 | 0.0879 |
| m11 | 1 0 1 1 | 1 | 0 | 1 | 0.0625 | 0.0625 | 0.0879 |
| m12 | 1 1 0 0 | 1 | 1 | 0 | 0.0625 | 0.0625 | 0.0527 |
| m13 | 1 1 0 1 | 1 | 1 | 1 | 0.0625 | 0.0625 | 0.0527 |
| m14 | 1 1 1 0 | 1 | 1 | 0 | 0.0625 | 0.0625 | 0.0527 |
| m15 | 1 1 1 1 | 1 | 1 | 0 | 0.0625 | 0.0625 | 0.0527 |

TABLE VII

| | Only $M_{m9;\ 1\to0}$ | $M_{m9;\ 1\to0}$ and $K_{m2;\ 1\to0}$ |
|---|---|---|
| Error Probability of $M_{m9}$ | 1001 / ↓ ↘ 0.5625 0.625 0.5 0.5 = 0.0879 | 1001 / ↓ ↘ 0.5 0.625 0.5 0.5 = 0.0781 |
| Error Rate of $M_{m9}$ | 8.79% | 7.81% |
| Total Power Saving | 3.26% | 2.43% |

TABLE VIII

| | | $\alpha = P(Out=0) \times P(Out=1)$ |
|---|---|---|
| LUT K | Original | $0.4375 \times 0.5625 = 0.2461$ |
| | Only $K_{m2;\ 1\to0}$ | $0.5 \times 0.5 = 0.25$ |
| | Only $K_{m2,3,5;\ 1\to0}$ | $0.625\ 0.375 = 0.2344$ |

TABLE IX

| | Only $M_{m9;\ 1\to0}$ | $M_{m9;\ 1\to0}$ and $K_{m2,3,5;\ 1\to0}$ |
|---|---|---|
| Error Probability of Mm9 | 1001 / ↓ ↘ 0.5625 0.625 0.5 0.5 = 0.0879 | 1001 / ↓ ↘ 0.375 0.625 0.5 0.5 = 0.0586 |
| Error Rate of Mm9 | 8.79% | 5.86% |
| Error Rate of Mm14 | — | 1.76% |
| Total Error Rate | 8.79% | 7.62% |
| Total Power Saving | 3.26% | 4.07% |

To generalize the notion of adding multiple errors the theorem 2 is introduced. Consider an arbitrary LUT X that has a preceding LUT Y in a design. Theorem 2 states that given an error injected into X, there always exists a scenario for the injection of error(s) in Y that reduces the negative impact of the first error in X while creating a larger dynamic power saving.

In order to analyze the proof of the theorem: Let's assume that the first error is applied on minterm i of X ($X_{mi}$). Further, assume that Y is connected to the jth input of X. Then, if the jth bit of the 4-bit binary value of i is 1, altering any minterm of Y with a value of 1 into 0 would reduce the chance of observing mi and consequently reduce the probability of observing $X_{mi}$. This means that an error in any minterm of Y with a value of 1 will satisfy the requirement of Theorem 2. If the jth bit of the 4-bit binary value of i is 0, the same argument still holds but the second error has to be a change of 0 to 1 in order to reduce the probability of observing Xmi. In this case, a change of 0 to 1 satisfies the Theorem 2.

When a single error in either case did not reduce the power it means that the difference between $P_k(Out=0)$ and $P_k(Out=1)$ is reduced by the single error. Now, applying multiple errors in this case will eventually make the difference between $P_k(Out=0)$ and $P_k(Out=1)$ large enough to produce a considerable power saving. Therefore, making multiple errors in Y will eventually provide the desirable power saving. Theorem 2 guarantees the existence of a multiple error approximation scenario that offers desirable power saving while reducing the negative impact of the first error. In order to find that scenario, Algorithm 2 is proposed and described in the following four steps:

At step 1, the user makes sure that there is at least one minterm in the output LUT whose probability allows the maximum error constraint to be satisfied. The theory of approximation (Theorem 1) is used to find an approximation error in the LUT. Once the target minterm to be changed in the output LUT is determined, the power saving is reported and the algorithm 1 potentially stop. If no single error in the output LUT is found or a higher power saving is desired, Algorithm 1 is run to find an approximation error in the intermediate LUT. Further, if the error generated by making a change in the intermediate LUT, violates the maximum error constraint or a higher power saving is desired, the error masking concept is used to find an approximation error in the intermediate LUT. The use of one or more errors in one of the preceding LUTs will provide a better result according to Theorem 2.

At step 2, the candidate LUT is found among the preceding LUT, by looking for the input that has the lowest probability for that minterm. The LUT connected to the input is the next target for injecting error. At step 3, the value of minterm is changed from 1 to 0 or vice versa depending on the value of the associated bit in the binary value of the chosen minterm. At step 4, multiple errors of the same kind are applied to increase the difference between P(out=0) and P(Out=1), if the single error found in Step 3, does not reduce the total power consumption, thereby lowering the power consumption. In an extreme case, if one or more errors are introduced in an LUT that makes all 8 pairs in one of the columns of table IV hold the same value, then the preceding LUT that is connected to the corresponding input will be completely masked. This provides full freedom to alter K in order to minimize its power consumption as well as the total power consumption.

The post synthesis approximation platform 206 generates a new approximate bit stream using the received bit stream and maximum possible error rate. The new approximate bit stream is provided to an approximate design implementation platform 210. Further, the approximate design implementation platform 210 programs the new approximated bit stream into the FPGA, to get an approximate design with reduced power consumption.

Therefore, the embodiments herein enable a designer to design a digital system with reduced power consumption. The designer applies approximate computing on a reconfigurable device for reducing the power consumption. The method of applying the approximate computing requires minimum human intervention. The method includes introducing error into the LUT of the reconfigurable device while ensuring that total error does not exceed the maximum possible error rate.

The foregoing description of the specific embodiments will so fully reveal the general nature of the embodiments herein that others can, by applying current knowledge, readily modify and/or adapt for various applications such as specific embodiments without departing from the generic concept, and, therefore, such adaptations and modifications should and are intended to be comprehended within the meaning and range of equivalents of the disclosed embodiments.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modifications. However, all such modifications are deemed to be within the scope of the claims.

What is claimed is:

1. A method for applying approximate computing to internal circuit of a digital system, the method comprises:
    writing/defining a description of the internal circuit of the digital system, wherein the digital system is a Look Up Table (LUT) based reconfigurable devices, and wherein the reconfigurable device is a Field Programmable Gate Array (FPGA);
    generating a bit stream containing information regarding contents of a programmable component, and wherein the programmable component is a LUT and the connection between multiple LUTs;
    generating an actual design of FPGA using a design tool for FPGA;
    providing an input, the bit stream and the actual design of FPGA to a synthesis platform, wherein the input includes a plurality of parameters includes a maximum possible error rate, forbidden points and a probability of change of inputs, and wherein the input is derived from the defined description of the internal circuit by a designer; and
    manipulating the bit stream to create an approximate computing design of an FPGA for reducing a dynamic power consumption of the digital system, and wherein the bit stream is manipulated by injecting/introducing an error on the LUT, and wherein the error is calculated based on a theory of approximation, and wherein the error introduced is calculated/ estimated to ensure that total error does not exceed a maximum possible error rate.

2. The method as claimed in claim 1, wherein the step of introducing error on the LUT based on the theory of approximation comprises:
    changing entries of a row in the LUT with highest probabilities of value 0 to 1 when the probability of bit '0' is less than probability of bit '1';
    changing entries of a row with highest probabilities of value 1 to 0 when the probability of bit '0' is greater than probability of bit '1'; and
    changing entries of a row with highest probabilities of value 1 to 0 or vice versa when the probability of bit '0' is equal to probability of bit '1'.

3. The method as claimed in claim 1, wherein the error is introduced/injected on an intermediate LUT when none of changes in the output of the LUT satisfies the error constraint.

4. The method as claimed in claim 1, wherein the error is introduced on the LUT among a cascaded LUT by identifying the LUT that creates the minimum number of observable error pairs in subsequent LUT.

5. The method as claimed in claim 1, wherein the bit stream is modified based on an increase in probability of occurrence of bit '0' and probability of occurrence of bit '1' in the LUTs.

6. The method as claimed in claim 1, wherein the approximate computing design is applied on a plurality of types of digital systems, and wherein the plurality of digital systems includes reconfigurable or reprogrammable devices.

7. The method as claimed in claim 1, wherein the approximate computing design is introduced into the exact/actual design description at any one of a plurality of mutually different levels of abstraction and design, selected from a group consisting of schematic, gate, structure, data flow, RTL, and system.

8. The method as claimed in claim 1, wherein a standalone tool is used as an add-on with the existing simulation, synthesis and/or placement tools or a standalone tool is integrated into the existing simulation, synthesis and/or placement tools for applying approximate computing.

9. The method as claimed in claim 1, wherein a standalone simulation, synthesis and/or placement tool is operated in tandem with and independently from other existing simulation, synthesis and/or placement tools applying approximate computing using an algorithm.

10. The method as claimed in claim 1, wherein a standalone simulation, synthesis and/or placement tool is operated independently and in communication with the existing simulation, synthesis and/or placement tools behind a graphical user interface for applying approximate computing using an algorithm.

11. The method as claimed in claim 1, wherein a simulation, synthesis and/or placement tool is integrated into existing simulation, synthesis and/or placement tools and operated for applying approximate computing using an algorithm.

12. The method as claimed in claim 1, wherein the approximate computing design is a software code comprising a set of specific design characteristics including error rate, power consumption, and speed.

13. The method as claimed in claim 1, comprises reducing resources (area) and/or delay of a final circuit of FPGA implemented on a reconfigurable architecture.

14. The method as claimed in claim 1, further comprises identifying the plurality of parameters based on the description of the original design with a minimal manual intervention of designer.

15. The method as claimed in claim 1, comprises minimizing a power consumption dynamically with a constraint on the maximum error rate.

16. The method as claimed in claim 1, comprises minimizing the error rate while maintaining design constraint of the power consumption under a given amount.

17. The method as claimed in claim 1, wherein the approximate computing design is formed as a soft IP core with a preset design characteristics, and wherein the preset design characteristics comprises error rate, power consumption, and speed.

* * * * *